Nov. 17, 1953 — W. L. WILMES — 2,659,631
CENTRIFUGAL LIQUID NOZZLE
Filed Sept. 19, 1950
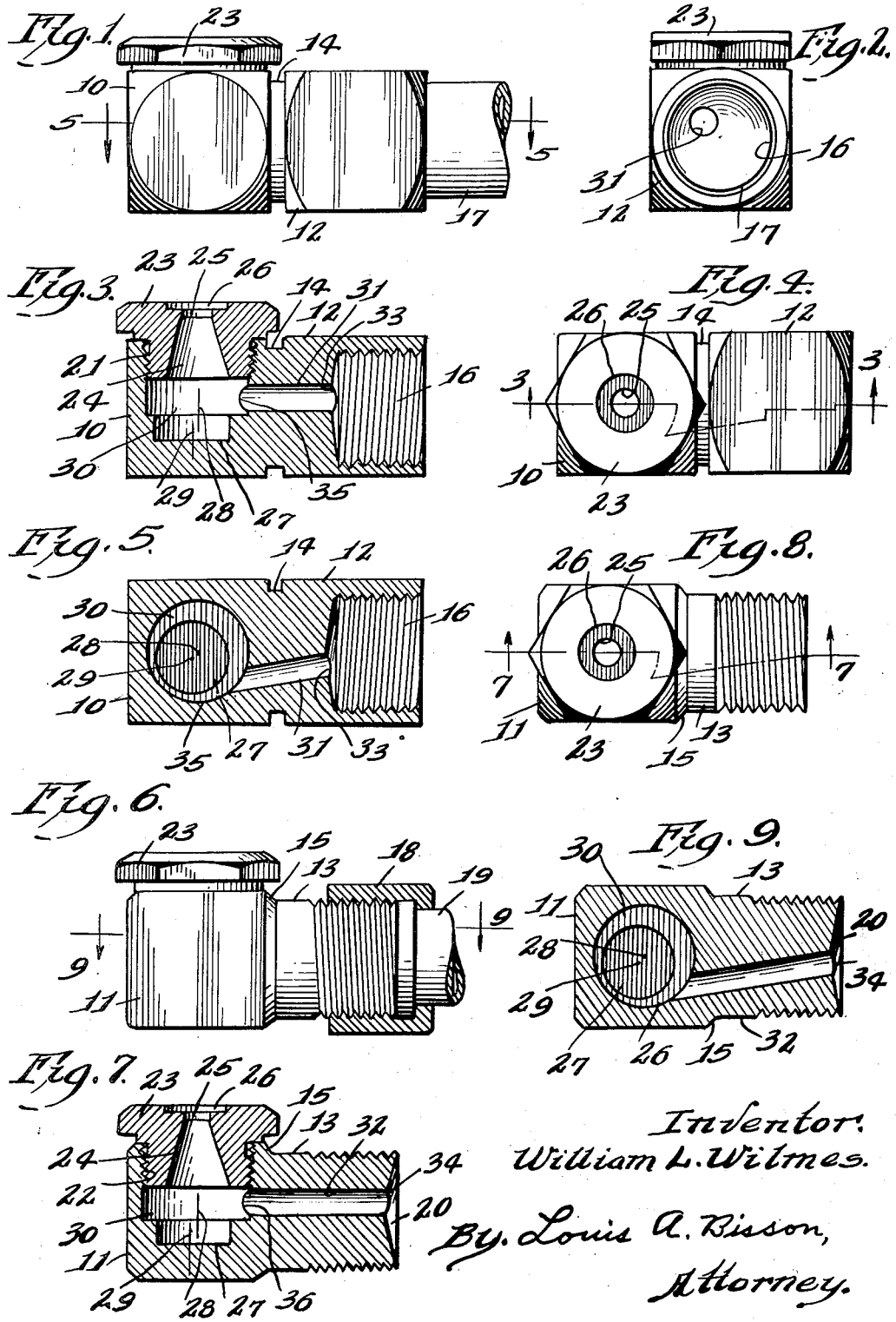

Patented Nov. 17, 1953

2,659,631

UNITED STATES PATENT OFFICE 2,659,631

CENTRIFUGAL LIQUID NOZZLE

William L. Wilmes, Chicago, Ill., assignor to Binks Manufacturing Company, Chicago, Ill., a corporation of Delaware Application September 19, 1950, Serial No. 185,519

1 Claim. (Cl. 299—114)

The present invention relates to nozzles, such as those for causing a whirl of liquid in a chamber thereof having a portion concentric with the outlet orifice and a portion that is offset or eccentric to such outlet orifice of the device.

An object of the invention is to provide a novel device which has the advantage of having a capacity of spray producing from a much smaller whirl chamber than theretofore, and which new device can be machined from bar stock with reduced machining costs as well as a saving in material costs.

Another object of the invention is to produce a novel nozzle structure as herein disclosed and which can be regarded as novel improvements over particularly those disclosed in United States Patents No. 1,938,000, granted December 5, 1933, to Fritz Wahlin, on Hollow Cone Spraying Nozzle; and No. 1,961,408, granted June 5, 1934, to Fritz Wahlin, on Spray Head.

Other objects, advantages, capabilities, features and the like are comprehended by the invention as will later appear and as are inherently possessed by the invention.

Referring briefly to the drawings:

Fig. 1 is a side view in elevation of a device constructed in accordance with the invention;

Fig. 2 is an end view in elevation of the device shown in Fig. 1;

Fig. 3 is a longitudinal sectional view taken in a plane represented by line 3—3 in Fig. 4 of the drawings;

Fig. 4 is a top plan view of the device as shown in Figs. 1 and 3, without the connecting tube shown in Fig. 1;

Fig. 5 is a horizontal sectional view taken in a plane represented by line 5—5 in Fig. 1 of the drawings;

Fig. 6 is a side view, similar to that of Fig. 1, of the invention having a male type of entry end portion in lieu of the female type shown in Figs. 1, 2, 3, 4 and 5;

Fig. 7 is a longitudinal sectional view taken in a plane represented by line 7—7 in Fig. 8 of the drawings;

Fig. 8 is a top plan view of the device shown in Figs. 6 and 7, without the connecting tube and coupling shown in Fig. 6;

Fig. 9 is a horizontal sectional view taken in a plane represented by line 9—9 in Fig. 6 of the drawings.

Referring more in detail to the drawings the device is shown as comprising a chamber or head portion 10 (Figs. 1-5), or 11 (Figs. 6-9), and an entry end portion 12 (Figs. 1-5) or 13 (Figs. 6-9) with an intermediate connection portion 14, 15, as shown.

The entry end portion 12 has an entry chamber 16 (see Figs. 2, 3, 5) which may be suitably threaded or otherwise formed for the coupling thereto a liquid supply duct or pipe 17. The entry end portion 13 (see Figs. 6, 7, 8, 9) may be suitably externally threaded or otherwise formed for the receiving of a connecting or coupling means 18 (see Fig. 6) connected to a duct or pipe 19 (see Fig. 6) for supplying the fluid, as liquid, the end of the portion 13 also having a tapered or similar entry portion 20 having communication with the duct 19 (see Figs. 6, 7 and 9).

In both cases, the chamber portion 10, 11, has an upper opening 21, 22, which may be threaded to receive a nozzle member or element 23 (the same in both cases) having suitable threading to fit the threads 21, 22, as shown particularly in Figs. 3, 7. The head of the nozzle member 23 may have multiple faces for engagement of a suitable tool, as a wrench, for screwing or unscrewing the member 23 to or from place.

In the nozzle member 23 is provided a tapered nozzle passage 24 tapering from the inner end of the member 23 to the outer or top end portion thereof, where is provided a short throat part or the like 25 which is preferably cylindrical as shown. At the top of the nozzle member 23 may be a thin or shallow well or like part 26 of greater diameter than that of the throat or cylindrical portion 25, to offer no resistance or influence on the stream whirling or rotating in the throat or neck portion 25 as it issues from the nozzle part 24 with a whirling or spinning motion or action.

Within the head portion 10, 11 are provided round or cylindrical chambers, comprising a lower chamber 27 which is eccentric to the nozzle passage 24, or in other words the axis of the chamber 27 is eccentric to or non-coaxial with the axis of the nozzle passage 24, or in other words referring to Figs. 5 and 9, the locus of the axis of the nozzle passage 24 is represented at point 28 (see Figs. 5 and 9) and the locus of the axis of the chamber 27 is represented at the point 29 (see Figs. 5 and 9), so that the center of the chamber 27 is eccentric to the nozzle passage 24.

Just above the chamber 27 is provided another chamber 30 also of round or cylindrical form and in communication at its lower end with the upper end of the lower chamber 27 and at its upper end with the lower end and large end of the nozzle passage 24. See Figs. 3 and 7. The axis of this chamber 30 is coaxial with that of the nozzle passage 24.

Communicating with the chamber 30 is a laterally and tangentially located fluid entry passage 31, 32 of which the passage 31 has its entry 33 end in or at chamber 16 (see Figs. 3, 5) and of which the passage 32 has its entry 34 in or at the tapered entry 29 (see Figs. 7 and 9), and of which each of passages 31, 32, has its outlet end or discharge end 35, 36 tangential to the wall of the chamber 30 (see Figs. 5, 9), so that as the fluid passing through the passage 31, 32, it will enter the chamber 30 at a tangent to cause the fluid to rotate or eddy in the chamber 30.

It has been found that when a fluid flows in tangently in a chamber like chamber 30, that there is a reaction of the fluid against the lower part or bottom of the chamber 30, whether the lower part of such chamber be depressed and of any form, such as a cone or the like, and also an erosion or the like, perhaps due to the reactive force set up when the fluid was projected out the nozzle, such as a nozzle 24 as here shown, and at the same time the spray from the nozzle would not be even or balanced.

The inventor herein discovered that to provide a chamber, as chamber 27, below or beneath the entry chamber, as chamber 30, and also have the axis of such lower chamber eccentric to the axis of the upper chamber, as chamber 30, or eccentric to the axis of the passage of the nozzle, as nozzle passage 24, that such disadvantages were avoided. The present device herein disclosed sprays the fluid with a balance or uniformity and there is no eroding or wearing away of the lower part of the device as heretofore. It seems that by the forming of a mass of fluid, which also moves or rotates as it does in the upper chamber, as chamber 30, it seems to act as a sort of buffer or the like, and while it might lower the rotative speed of the fluid in the upper chamber, it seems to take whatever force or shock that might be present and tones the outgoing stream through the nozzle part 24 to issue evenly and balanced or the like, and without any eroding or injury to the lower portion of the device.

While I have herein described and upon the drawings shown an illustrative embodiment of the invention, it is to be understood that the invention is not limited thereto but comprehends other constructions, details, arrangements of parts, features, and the like without departing from the spirit of the invention.

Having thus disclosed the invention, I claim:

A spray nozzle comprising a body having therein a circular whirling chamber axially aligned with a discharge outlet at one side thereof, a circular control chamber of smaller diameter than the whirling chamber at the other side of said whirling chamber and eccentric thereto, said whirling chamber having an inlet passage leading thereto tangentially to inject liquid into the whirling chamber for discharge through said discharge outlet in whirling form, said control chamber having at its juncture with the whirling chamber an annular surrounding shoulder of non-uniform width throughout its circumference constructed and arranged to provide a uniform flow of liquid through said discharge outlet with minimum wearing away of the walls defining said chambers, said control chamber and shoulder being formed and arranged whereby liquid is discharged from the inlet passage into the whirling chamber adjacent that portion of said shoulder having a relatively small width.

WILLIAM L. WILMES.

References Cited in the file of this patent

UNITED STATES PATENTS

| Number | Name | Date |
|---|---|---|
| 2,247,897 | Wahlin | July 1, 1941 |

FOREIGN PATENTS

| Number | Country | Date |
|---|---|---|
| 201,608 | Great Britain | July 20, 1923 |